United States Patent [19]
Ramo

[11] Patent Number: 5,909,843
[45] Date of Patent: Jun. 8, 1999

[54] STEAM RADIATOR EXHAUST VALVE

[76] Inventor: Henry Ramo, 77-07 164th St., Flushing, N.Y. 11366

[21] Appl. No.: 08/935,714

[22] Filed: Sep. 23, 1997

[51] Int. Cl.$^6$ .................................................. G05D 23/08
[52] U.S. Cl. ........................................ 236/66; 236/101 E
[58] Field of Search ............................ 236/66, 64, 101 E

[56] References Cited

U.S. PATENT DOCUMENTS

| | | | |
|---|---|---|---|
| 265,239 | 10/1882 | Brown | 236/66 |
| 312,042 | 2/1885 | Vanderman | 236/64 |
| 442,911 | 12/1890 | Poulson | 236/66 |
| 2,845,227 | 7/1958 | Leonardis | 236/66 |
| 3,148,829 | 9/1964 | Leopardo | 236/66 |
| 3,260,458 | 7/1966 | Klinefelter | 236/66 |
| 4,828,169 | 5/1989 | Smith | 236/66 |

*Primary Examiner*—William E. Tapolcai
*Attorney, Agent, or Firm*—Richard L. Miller, P.E.

[57] ABSTRACT

An exhaust valve for threading into a street elbow threaded into an exhaust port of a conventional steam radiator that includes a base portion, a cap portion supported by the base portion, and a bimetallic arm contained in the cap portion. The base portion has a ledge that provides a broad surface onto which condensate in exhaust steam from the conventional steam radiator is attracted and deposited as it passes through the base portion so as to prevent the steam condensate from interfering with the exhaust steam from the conventional steam radiator. The base portion further has only one central throughbore that is coaxial with the bimetallic arm so as to provide a direct path for the exhaust steam from the conventional radiator without any bends that can produce obstructive eddy currents.

11 Claims, 1 Drawing Sheet

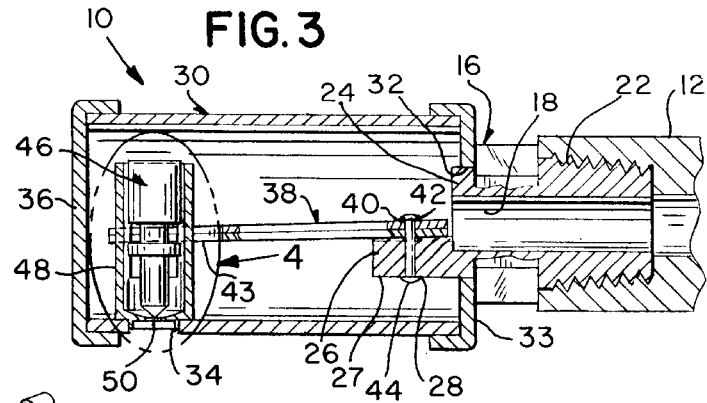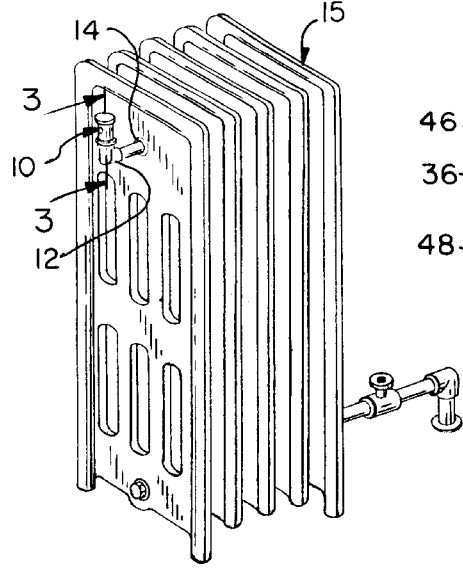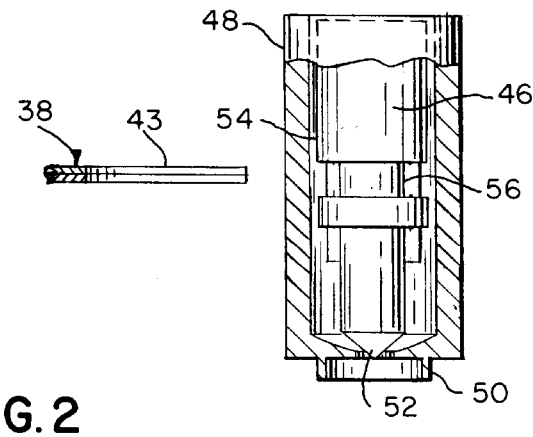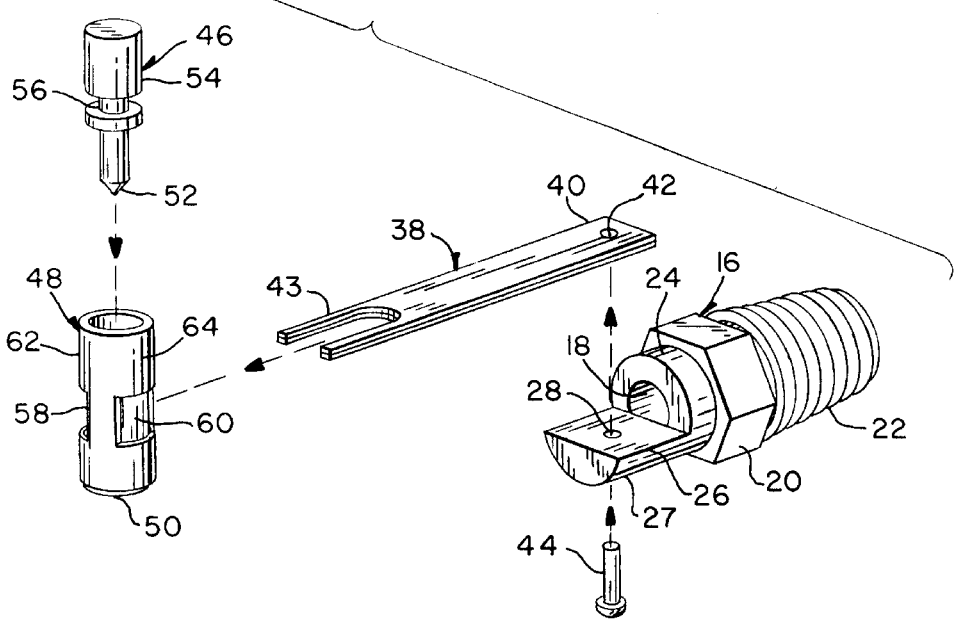

STEAM RADIATOR EXHAUST VALVE

BACKGROUND OF THE INVENTION

1. Field of the Invention

The present invention relates to an exhaust valve. More particularly, the present invention relates to an steam radiator exhaust valve.

2. Description of the Prior Art

Numerous innovations for exhaust valves for steam radiators have been provided in the prior art that will be described. Even though these innovations may be suitable for the specific individual purposes to which they address, however, they differ from the present invention.

FOR EXAMPLE, U.S. Pat. No. 2,845,227 to Leonardis teaches a steam exhaust valve assembly for venting radiators comprising, a housing having a port adjacent its upper end means for interconnecting the housing and a radiator portion of a steam heating system with the means comprising a steam supply port and a liquid condensate return port, a tubular valve support member having an annular forward portion extending through the port and fixed therein in a manner providing a seal between its outer surface and the housing and defining a vent port concentric with the port in the housing wall, with the body of the valve support extending into the housing and having a portion of its wall cut away to prevent the accumulation of sediment within the support member and to give entrance to the bifurcated upper end of a bi-metal arm the upper end of which is bifurcated, means for supporting the bi-metal arm within the housing with its bifurcated upper end extending into the cut away portion of the support member, and a valve member contained within the support member and movable axially within the support member for opening and closing the port defined by the forward end of the support member with the valve member being slotted intermediate its ends to make sliding engagement with the arms of the bifurcated upper end of the bi-metal arm whereby as the arm is bent or straightened in response to temperature variations the valve member is moved within the support member for opening and closing the port defined by the forward portion of the valve support member.

It is apparent that innovations for exhaust valves for steam radiators have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a steam radiator exhaust valve that avoids the disadvantages of the prior art.

ANOTHER OBJECT of the present invention is to provide a steam radiator exhaust valve that is simple and inexpensive to manufacture.

STILL ANOTHER OBJECT of the present invention is to provide a steam radiator exhaust valve that is simple to use.

BRIEFLY STATED, YET ANOTHER OBJECT of the present invention is to provide an exhaust valve for threading into a street elbow threaded into an exhaust port of a conventional steam radiator that includes a base portion, a cap portion supported by the base portion, and a bimetallic arm contained in the cap portion. The base portion has a ledge that provides a broad surface onto which condensate in exhaust steam from the conventional steam radiator is attracted and deposited as it passes through the base portion so as to prevent the steam condensate from interfering with the exhaust steam from the conventional steam radiator. The base portion further has only one central throughbore that is coaxial with the bimetallic arm so as to provide a direct path for the exhaust steam from the conventional radiator without any bends that can produce obstructive eddy currents.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing

BRIEF DESCRIPTION OF THE DRAWING

The figures on the drawing are briefly described as follows:

FIG. 1 is a diagrammatic perspective view of the present invention installed on a conventional steam radiator;

FIG. 2 is an exploded perspective view of the internal components of the present invention;

FIG. 3 is an enlarged cross section view taken on line 3—3 in FIG. 1; and FIG. 4 is an enlarged diagrammatic side elevational view, in partial cross section, of the area generally enclosed by the dotted ellipse identified by arrow in FIG. 2.

LIST OF REFERENCE NUMERALS UTILIZED IN THE DRAWING

- 10  steam radiator exhaust value of the present invention
- 12  street elbow
- 14  exhaust port of conventional steam radiator 15
- 15  conventional steam radiator
- 16  base portion
- 18  only one central throughbore extending longitudinally completely through base portion 16
- 20  nut-shaped portion of base portion 16
- 22  threaded portion extending coaxially from one side of nut-shaped portion 20 of base portion 16
- 24  neck extending coaxially from other side of nut-shaped portion 20 of base portion 16
- 26  ledge extending coaxially from neck 24 of base portion 16
- 27  exterior surface of ledge 26 of base portion 16
- 28  throughbore extending transversely through ledge 26 of base portion 16
- 30  cap portion
- 32  throughbore in lowest end 33 of cap portion 30
- 33  lowest end of cap portion 30
- 34  vent port in cap portion 30 adjacent upper end 36 of cap portion 30
- 36  upper end of cap portion 30
- 38  bimetallic arm in cap portion 30
- 40  lower end of bimetallic arm 38 in cap portion 30
- 42  throughbore in lower end 40 of bimetallic arm 38 in cap portion 30
- 43  free end of bimetallic arm 38 in cap portion 30
- 44  rivet
- 46  member loosely supported within tubular cage 48
- 48  tubular cage
- 50  forward end of tubular cage 48
- 52  leading end of member 46
- 54  body portion of member 46
- 56  circumferential groove around body portion 54 of member 46
- 58  space in one side wall 62 of tubular cage 48
- 60  space in opposite side wall 64 of tubular cage 48

DETAILED DESCRIPTION OF THE PREFERRED EMBODIMENT

Referring now to the figures in which like numbers indicate like parts, and particularly to FIG. 1, the steam radiator exhaust valve of the present invention is shown generally at 10 threaded into, preferably, a street elbow 12 that is threaded into an exhaust port 14 of a conventional steam radiator 15 so as to allow the steam radiator exhaust valve to extend upwardly relative to the conventional steam radiator 15.

The configuration of the steam radiator exhaust valve 10 can best be seen in FIGS. 2–4 and as such will be discussed with reference thereto, The steam radiator exhaust valve 10 includes a base portion 16 that is elongated and vertically-oriented and has only one central throughbore 18 extending longitudinally completely therethrough for conducting the exhaust steam away from the conventional steam radiator 15.

The base portion 16 further has a nut-shaped portion 20 for facilitating threading the base portion 16 into the street elbow 12.

The base portion 16 further has a threaded portion 22 that extends coaxially from one side of the nut-shaped portion 20 of the base portion 16 for threadably engaging the street elbow 12.

The base portion 16 further has a neck 24 that is cylindrically-shaped and extends coaxially from the other side of the nut-shaped portion 20 of the base portion 16.

The base portion 16 further has a ledge 26 that is semi-cylindrically-shaped and extends coaxially from the neck 24 of the base portion 16 and provides a broad surface onto which the condensate in the exhaust steam from the conventional steam radiator 15 is attracted and deposited as it passes through the base portion 16 so as to prevent the steam condensate from interfering with the exhaust steam from the conventional steam radiator 15.

The ledge 26 of the base portion 16 has an exterior surface 27 that is coextensive with that of the neck 24 of the base portion 16, and a throughbore 28 that extends transversely therethrough.

The steam radiator exhaust valve 10 further includes a cap portion 30 with a throughbore 32 in its lowest end 33. The lowest end 33 of the cap portion 30 is supported coaxially on the nut-shaped portion 20 of the base portion 16, with the cap portion 30 extending vertically upwardly therefrom, and with the throughbore 32 in the lowest end 33 of the cap portion 30 being in fluid communication with the throughbore 18 in the base portion 16 and receiving the neck 24 of the base portion 16, and with the ledge 26 of the base portion 16 extending longitudinally into the cap portion 30.

The cap portion 30 further has a vent port 34, adjacent its upper end 36.

The cap portion 30 further has a bimetallic arm 38 with a lower end 40 having a throughbore 42 therein and a free end 43, with the lower end 40 of the bimetallic arm 38 in the cap portion 30 lying on the ledge 26 of the base porion 16 and being affixed thereto by a rivet 44 extending through the throughbore 42 in the lower end 40 of the bimetallic arm 38 in the cap portion 30 and the throughbore 28 in the ledge 26 of the base porion 16, and with the free end 43 of the bimetallic arm 38 in the cap portion 30 extending longitudinally upwardly in the cap portion 30, and with the bimetallic arm 38 in the cap portion 30 being coaxial with the only one central throughbore 18 in the base portion 16 so as to provide a direct path for the exhaust steam through the only one central throughbore 18 in the base portion 16 and onto the bimetallic arm 38 in the cap portion 30 without any bends that can produce obstructive eddy currents.

The free end 43 of the bimetallic arm 38 in the cap portion 30 is bifurcated to slightly engage a member 46 by which the vent port 34 in the cap portion 30 is opened and closed.

The member 46 is loosely supported within a tubular cage 48 that has a forward end 50 that is reduced and fixedly inserted into the vent port 34 in the cap portion 30.

The member 46 has a leading end 52 that is tapered to seat within the vent port 34 in the cap portion 30, or more exactly within the forward end 50 of the tubular cage 48.

The member 46 has a body portion 54 with a circumferential groove 56 therearound, with the arms of the free end 43 of the bimetallic arm 38 in the cap portion 30 extending therein on opposite sides of the member 24, thus making a sliding engagement with the member 46 which is maintained regardless of lengthening and shortening of the bimetallic arm 38 in the cap portion 30 as it bends and unbends in response to temperature changes within the steam radiator exhaust valve 10.

The tubular cage 48 has cut away spaces 58 and 60 in its opposite side wall portions 62 and 64, respectively, to permit the free end of the bimetallic arm 38 in the cap portion 30 to extend into and through the tubular cage 48 and to engage the member 46 within the cage 48.

The interior of the cap portion 30 is rifled longitudinally so as to cause the exhaust steam to swirl therein and encircle both metals of the bimetallic arm 38 in the cap portion 30 concurrently and ensure that both metals of the bimetallic arm 38 in the cap portion 30 receive the exhaust steam at substantially the same volume and pressure and thereby substantially the same temperature to assure their proper joint bending, as opposed to one metal receiving a different volume and pressure and thereby a different temperature than the other.

In operation, the tubular cage 48 serves to maintain the member 46 in alignment with the vent port 34 in the cap portion 30 without regard to the bending and unbending of the bimetallic arm 38 in the cap portion 30.

As the bimetallic arm 38 in the cap portion 30 bends and unbends, it moves forwardly and rearwardly within the tubular cage 48, thus closing and opening the vent port 34 in the cap portion 30.

It will be understood that each of the elements described above, or two or more together may also find a useful application in other types of constructions differing from the types described above.

While the invention has been illustrated and described as embodied in a steam radiator exhaust valve, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An exhaust valve for threading into a street elbow threaded into an exhaust port of a conventional steam radiator, comprising:

a) a base portion;

b) a cap portion supported by said base portion; and c) a bimetallic arm contained in said cap portion, wherein said base portion is elongated and vertically-oriented and has only one central throughbore extending longitudinally completely therethrough for conducting exhaust steam away from the conventional steam radiator, wherein said base portion further has a nut-shaped portion for facilitating threading said base portion into the street elbow, wherein said base portion further has a neck that is cylindrically-shaped and extends coaxially from the other side of said nut-shaped portion of said base portion, wherein said base portion further has a ledge that is semi-cylindrically-shaped and extends coaxially from said neck of said base portion and provides a broad surface onto which condensate in exhaust steam from the conventional steam radiator is attracted and deposited as it passes through said base portion so as to prevent the steam condensate from interfering with the exhaust steam from the conventional steam radiator.

2. The valve as defined in claim 1, wherein said ledge of said base portion has an exterior surface that is coextensive with that of said neck of said base portion, and a throughbore that extends transversely therethrough.

3. The valve as defined in claim 2, said cap portion has a throughbore in its lowest end, with said lowest end of said cap portion being supported coaxially on said nut-shaped portion of said base portion, with said cap portion extending vertically upwardly therefrom, and with said throughbore in said lowest end of said cap portion being in fluid communication with said throughbore in said base portion and receiving said neck of said base portion, and with said ledge of said base portion extending longitudinally into said cap portion.

4. The valve as defined in claim 1, said cap portion further has a vent port, adjacent its upper end.

5. The valve as defined in claim 4, wherein said bimetallic arm has a lower end with a throughbore therein and a free end, with said lower end of said bimetallic arm lying on said ledge of said base porion and being affixed thereto by a rivet extending through said throughbore in said lower end of said bimetallic arm and said throughbore in said ledge of said base porion, and with said free end of said bimetallic arm extending longitudinally upwardly in said cap portion, and with said bimetallic arm being coaxial with said only one central throughbore in said base portion so as to provide a direct path for exhaust steam through said only one throughbore in said base portion and onto said bimetallic arm without any bends that can produce obstructive eddy currents.

6. The valve as defined in claim 5 wherein said free end of said bimetallic arm is bifurcated to slightly engage a member, by which said vent port in said cap portion is opened and closed.

7. The valve as defined in claim 6, wherein said member is loosely supported within a tubular cage that has a forward end that is reduced and fixedly inserted into said vent port in said cap portion, with said tubular cage serving to maintain said member in alignment with said vent port in said cap portion without regard to the bending and unbending of said bimetallic arm, and as said bimetallic arm bends and unbends, it moves forwardly and rearwardly within said tubular cage, thus closing and opening said vent port in said cap portion.

8. The valve as defined in claim 7, wherein said member has a leading end that is tapered for seating within said forward end of said tubular cage.

9. The valve as defined in claim 7, wherein said member has a body portion with a circumferential groove therearound, with arms of said free end of said bimetallic arm extending therein on opposite sides of said member, thus making a sliding engagement with said member which is maintained regardless of lengthening and shortening of said bimetallic arm as it bends and unbends in response to temperature changes within said exhaust valve.

10. The valve as defined in claim 7, wherein said tubular cage has cut away spaces and in its opposite side wall portions to permit said free end of said bimetallic arm to extend into and through said tubular cage and to engage said member within said cage.

11. The valve as defined in claim 1, wherein said cap portion has an interior that is rifled longitudinally so as to cause exhaust steam to swirl therein and encircle both metals of said bimetallic arm concurrently and ensure that both metals of said bimetallic arm receive the exhaust steam at substantially the same volume and pressure and thereby substantially the same temperature to assure their proper joint bending, as opposed to one metal receiving a different volume and pressure and thereby a different temperature than the other.

* * * * *